May 27, 1952     G. E. CORBIN     2,598,509
FISH SCALING DEVICE
Filed June 11, 1949
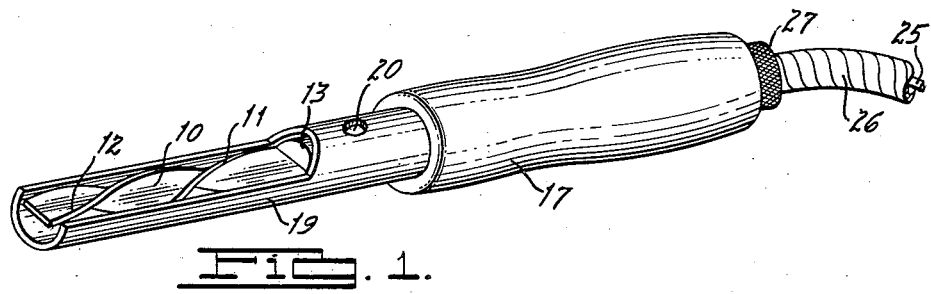
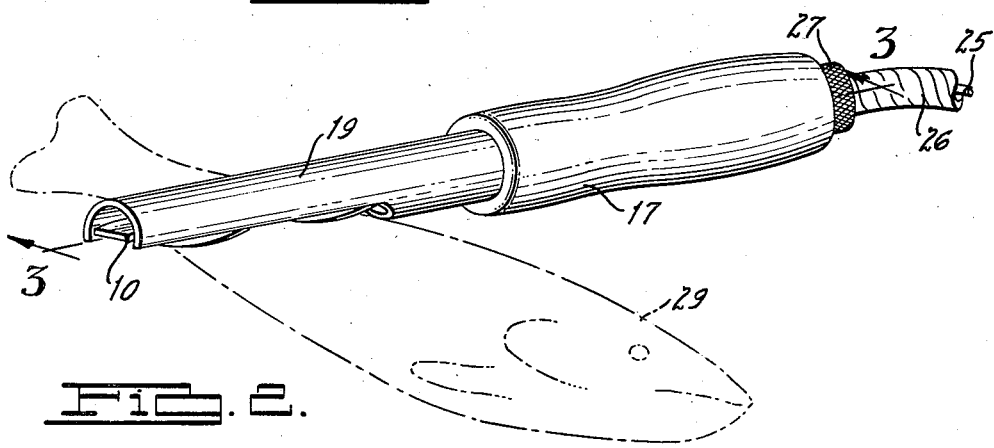
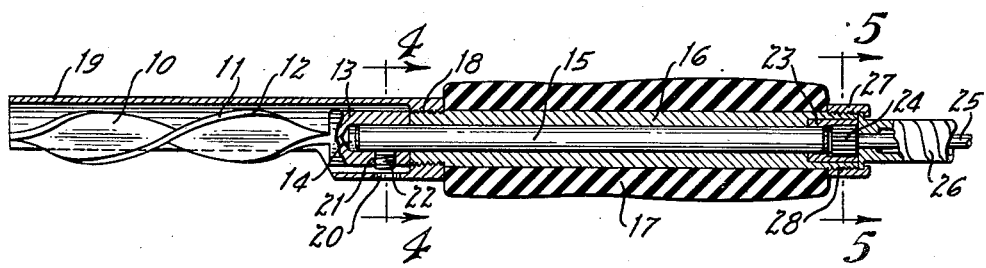
INVENTOR:
George E. Corbin,
BY Louis Chayka
ATTORNEY.

Patented May 27, 1952

2,598,509

UNITED STATES PATENT OFFICE 2,598,509

FISH SCALING DEVICE

George E. Corbin, Detroit, Mich.

Application June 11, 1949, Serial No. 98,613

1 Claim. (Cl. 17—5)

The object of my invention was to provide a power-operated device of a very simple design, and one of light construction, so that said device may be easily held in hand during its operative use. My further object was to design the device in such a manner that it would be highly efficient for both domestic and industrial uses, and perfectly safe when handled. Additionally, my object was to produce a device composed of few elements so that the cost of the device would be low.

I shall now describe my improvement with reference to the accompanying drawings, in which:

Fig. 1 is a perspective view of my device;

Fig. 2 is a perspective view of said device in its operative position as it would appear in the course of removing the scales of the fish, which is shown in dotted lines;

Fig. 3 is an enlarged sectional view on line 3—3 of Fig. 2;

Fig. 4 is an enlarged sectional view on line 4—4 of Fig. 3;

Fig. 5 is an enlarged sectional view on line 5—5 of Fig. 3.

Similar numerals refer to similar parts throughout the several views.

The main operative element of my device consists of a single metal blade 10 twisted about its longitudinal axis so that the edges 11 of said blade are disposed in a screw-like arrangement. The blade is of uniform thickness throughout its length, and is defined by edges disposed at right angle to the broad surface of said blade, the lines 12 of the intersection of the edges with said broad surface being keen and sharp, in the manner of the cutting edges of a screw auger. The blade is provided with a shank 13 having an axially disposed socket 14 for reception of one end of a shaft 15. The latter, being adapted for rotation, is contained within a sleeve 16 which forms the core of a handle 17. The end of the sleeve adjoining the shank 13 is threaded, as shown at 18, and serves to support a guard 19. The latter is made in the form of a cylinder, having an inwardly threaded end portion seated upon the threaded part 18 of sleeve 16, and having a part of its wall cut off so that in cross-section said guard has substantially the form of a one-half portion of a ring. The guard is designed as a safety feature, exposing the rotary blade only on one side, as best shown in Fig. 1. An aperture 20 within the wall of the guard is alined with an aperture 21 in socket 13, said aperture 21 being threaded for reception of a set screw 22 to be applied against shaft 15.

Mounted upon shaft 15, at its end removed from blade 10, is a nipple 33 secured upon the shaft for rotation therewith, the nipple being splined along a part of its length for engagement with a fluted member 24 connected to a flexible cable or wire 25 encased in a protective sheath 26. A retaining nut 27 threaded upon the rear end 28 of sleeve 16 serves to secure the fluted member 24 in an operative engagement with the shaft by means of the aforesaid nipple 23.

It will be understood that a flexible cable or wire 25 is to be rotated rapidly about its axis, and that this may be done by means of a suitable motor, which is not shown.

The operation of my device is quite obvious. When it is desired to employ the device for the uses for which it was designed, the blade is set to rotating by means of a motor, as above stated, whereupon the blade is applied against the scales of a fish 29 crosswise to the length thereof. The edges of the rotary blade, pressed against the scales, will scrape and throw them off.

It will be obvious that some changes may be made in the construction of my improved fish scaling device without departing from the inventive idea disclosed herein.

What I therefore wish to claim is as follows:

A fish scaling device comprising an elongated tubular handle, a fixed sleeve extending through the bore of the handle, the forward end of said sleeve projecting beyond the forward end of the handle, a driven shaft mounted for rotation within the sleeve, the forward end of the driven shaft projecting beyond the forward end of the sleeve, a spiral blade formed from a flat strip of metal, a socket member carried by the rear end of the blade and, adapted to receive the projecting forward end of the driven shaft for rotation therewith, a semi-cylindrical guard disposed over the spiral blade and secured at its rear end on the projecting forward end of the sleeve, and a flexible drive shaft connected to the rear end of the driven shaft.

GEORGE E. CORBIN.

REFERENCES CITED

The following references are of record in the file of this patent:

UNITED STATES PATENTS

| Number | Name | Date |
|---|---|---|
| D. 143,167 | Rieske | Dec. 11, 1945 |
| 1,642,802 | Barry | Sept. 20, 1927 |
| 1,746,813 | Barry | Feb. 11, 1930 |
| 1,758,675 | Reilly | May 13, 1930 |